United States Patent [19]
Shields et al.

[11] Patent Number: 5,488,402
[45] Date of Patent: Jan. 30, 1996

[54] METHOD AND APPARATUS FOR PREVENTING COLOR BLEED IN A MULTI-INK PRINTING SYSTEM

[75] Inventors: James P. Shields; Garold E. Radke, both of Corvallis, Oreg.

[73] Assignee: Hewlett-Packard Company, Palo Alto, Calif.

[21] Appl. No.: 401,534

[22] Filed: Mar. 10, 1995

Related U.S. Application Data

[62] Division of Ser. No. 926,259, Aug. 5, 1992, Pat. No. 5,428,383.

[51] Int. Cl.⁶ .................................................. C09D 11/02
[52] U.S. Cl. ........................................ 347/96; 106/20 D
[58] Field of Search ................... 347/86, 96; 106/20 D, 106/20 R

[56] References Cited

U.S. PATENT DOCUMENTS

| | | | |
|---|---|---|---|
| 4,709,244 | 11/1987 | Piatt et al. | 347/86 |
| 5,025,271 | 6/1991 | Baker et al. | 347/86 |
| 5,091,005 | 2/1992 | Mueller et al. | 106/20 D |
| 5,198,023 | 3/1993 | Stoffel | 106/20 D |
| 5,342,440 | 8/1994 | Wickramanayake | 106/22 R |

*Primary Examiner*—Benjamin R. Fuller
*Assistant Examiner*—Valerie Ann Lund

[57] ABSTRACT

A method for controlling color bleed in multi-color thermal inkjet printing systems. Color bleed involves the migration of coloring agents between adjacent zones in a multi-color printed image on a substrate. To control color bleed between any two ink compositions in a multi-ink system, at least one of the ink compositions will contain a precipitating agent (e.g. a multi-valent metal salt). The precipitating agent is designed to react with the coloring agent in the other ink composition of concern. As a result, when the two ink compositions come in contact, a precipitate is formed from the coloring agent in the other ink composition which prevents migration thereof and color bleed problems. This technique is applicable to printing systems containing two or more ink compositions, and enables distinct multi-color images to be produced without the problems normally caused by color bleed.

8 Claims, 3 Drawing Sheets

METHOD AND APPARATUS FOR PREVENTING COLOR BLEED IN A MULTI-INK PRINTING SYSTEM

This is a divisional of copending application Ser. No. 07/926,259 filed on Aug. 5, 1992, now U.S. Pat. No. 5,428,383.

BACKGROUND OF THE INVENTION

The present invention generally relates to thermal inkjet printing technology, and more particularly to a multi-color thermal inkjet printing system in which color bleed problems between adjacent printed regions are controlled.

Substantial developments have been made in the field of electronic printing technology. Specifically, a wide variety of highly efficient printing systems currently exist which are capable of dispensing ink in a rapid and accurate manner. Thermal inkjet systems are especially important in this regard. Thermal inkjet systems basically involve a cartridge which includes at least one ink reservoir/compartment in fluid communication with a substrate having a plurality of resistors thereon. Selective activation of the resistors causes thermal excitation of the ink and expulsion thereof from the ink cartridge. Representative thermal inkjet systems are discussed in U.S. Pat. No. 4,500,895 to Buck et al.; U.S. Pat. No. 4,794,409 to Cowger et al.; and the *Hewlett-Packard Journal*, Vol. 39, No. 4 (August 1988), all of which are incorporated herein by reference.

Recently, additional developments have been made in the field of thermal inkjet technology involving the generation of multi-colored images. This is typically accomplished through the use of specially-designed thermal inkjet cartridges having a plurality of individual ink compartments therein. Each of the compartments is designed to retain a selected ink having specific physical/color characteristics. By combining these ink materials on a substrate (e.g. paper) in varying configurations and quantities, multi-colored images having a high degree of print resolution and clarity may be produced. Exemplary thermal inkjet cartridges having multiple ink-containing compartments are illustrated and described in U.S. Pat. No. 4,771,295 to Baker et. al. and U.S. Pat. No. 5,025,271 to Baker et. al. which are both incorporated herein by reference.

However, under certain circumstances, a significant problem can occur when multi-color images are printed using thermal inkjet technology as described above. Specifically, this problem involves a situation known as "color bleed". In general and for the purposes set forth herein, color bleed is a term used to describe the diffusion/mixture of at least two different colored ink regions into each other. Such diffusion/mixture normally occurs when the different colored regions are printed next to and in contact with each other (e.g. at their marginal edges). For example, if a region consisting of a first coloring agent (e.g. black) is printed directly adjacent to and against another region consisting of a second coloring agent (e.g. yellow), the first coloring agent will often diffuse or "bleed" into the second coloring agent, with the second coloring agent possibly bleeding into the first coloring agent. Accordingly, indistinct images with a poor degree of resolution are produced. An insufficient degree of resolution results from the production of jagged, non-linear lines of demarcation between adjacent colored regions instead of sharp borders therebetween. This can create significant problems, especially when high volume printing systems are used to print complex, multi-color images.

In addition, color bleed problems in multi-ink systems are also caused by strong capillary forces generated in many commonly-used paper substrates. These capillary forces cause a "wicking" effect in which coloring agents are drawn into each other by capillary action through the fibers of the paper materials. This situation also results in a final printed image of poor quality and definition.

The present invention represents a unique and highly effective approach in the control of color bleed in multi-color thermal inkjet printing systems. The methods described herein may be implemented at a minimal cost, and do not require the use of extra equipment, custom-manufactured paper, and/or special paper coatings. The present invention therefore represents an advance in the art of thermal inkjet printing technology as described in greater detail below.

SUMMARY OF THE INVENTION

It is an object of the present invention to provide an improved multi-color thermal inkjet printing system.

It is another object of the invention to provide an improved multi-color thermal inkjet printing system which uses a plurality of colored ink materials to produce multi-color images.

It is another object of the invention to provide an improved multi-color thermal inkjet printing system which avoids problems associated with color bleed between adjacent printed regions.

It is a further object of the invention to provide an improved multi-color thermal inkjet printing system which avoids problems associated with color bleed through the use of specially formulated ink materials in which the coloring agents therein do not migrate into each other after printing.

It is a still further object of the invention to provide an improved multi-color thermal inkjet printing system which avoids problems associated with color bleed through the use of specially-formulated ink materials which are manufactured and used in an economical and highly effective manner.

It is an even further object of the invention to provide an improved multi-color thermal inkjet printing system which effectively avoids problems associated with color bleed without the use of extra equipment, custom-manufactured paper, and/or special paper coatings.

In accordance with the foregoing objects, the present invention involves a highly efficient thermal inkjet printing system which is capable of generating multi-color images on a substrate (e.g. paper) without color bleed between adjacent color regions. As indicated above, color bleed involves a situation in which the migration of coloring agents occurs between adjacent printed regions on a substrate. Color bleed substantially decreases print quality and resolution, and prevents distinct boundaries from being produced between adjacent color regions.

The invention as described herein is especially suitable for use in thermal inkjet and other printing systems which include multiple cartridges, with each cartridge having one or more different color ink materials therein. In addition, the invention is also suitable for use in connection with specially designed ink cartridges (described below) which each include a plurality of compartments that are designed to retain a different color ink therein. In many instances, each individual cartridge will contain separate supplies of cyan, yellow, and/or magenta ink, and may further include a separate supply of black ink. These inks are then applied in various patterns on a substrate (e.g. paper) using conventional techniques in order to produce a wide variety of multi-color images. However, regardless of which application method is used, color bleed can occur between adjacent printed regions if the coloring agents (e.g. dyes and/or pigment materials) from each ink region have physical characteristics which cause migration of the coloring agents into each other. This problem is especially acute when a region of black ink is printed adjacent to and in contact with a region of cyan, magenta, yellow or other color ink. Color bleed problems involving black ink cause a significant and extensive reduction in print quality.

As indicated above, the present invention involves a method for preventing color bleed between at least two different color ink compositions. To accomplish this, the specific ink compositions which are prone to color bleed are formulated in a unique and special manner. In general, the first ink composition of concern will include about 2–7% by weight coloring agent and about 1–70% by weight solvent. In a preferred embodiment, the coloring agent of the first ink composition will include one or more carboxyl and/or carboxylate groups as described in greater detail below. The second ink composition of concern (from a color bleed standpoint) will include a precipitating agent therein which is designed to react with the coloring agent in the first ink composition in order to prevent color bleed between the two ink compositions. Specifically, the precipitating agent from the second ink composition and the coloring agent from the first ink composition react to form a solid precipitate. Precipitate formation is facilitated by interaction between the precipitating agent and the carboxyl/carboxylate groups associated with the coloring agent of the first ink composition. Precipitate formation prevents migration of the coloring agent from the first ink composition into the second ink composition when both compositions are printed adjacent to and in contact with each other. In a preferred embodiment, the precipitating agent consists of a multi-valent metal salt. Exemplary metal cations suitable for use in the multi-valent metal salt include but are not limited to $Ca^{+2}$, $Cu^{+2}$, $Co^{+2}$, $Ni^{+2}$, $Fe^{+2}$, $La^{+3}$, $Nd^{+3}$, $Y^{+3}$, or $Al^{+3}$. Exemplary anions which may be coupled with these cations include but are not limited to $NO_3^-$, $F^-$, $Cl^-$, $Br^-$, $I^-$, $CH_3COO^-$, and $SO_4^{-2}$. Preferably, the second ink composition will include about 1–15% by weight multi-valent metal salt.

The second ink composition containing the multi-valent metal salt will further include a selected coloring agent as described in greater detail below which will not physically or chemically react with the precipitating agent. Specifically, the second ink composition will include about 2–7% by weight coloring agent, in combination with about 1–70% by weight solvent.

When the first ink composition and second ink composition are printed adjacent to and in contact with each other on a substrate, the above-described precipitation reaction will occur between the multi-valent metal salt of the second ink composition and the coloring agent of the first ink composition. While the foregoing reaction does not significantly affect the desired visual/color characteristics of the printed image, it does, in fact, eliminate migration of the coloring agent from the first ink composition into the second ink composition. In addition, while this procedure is primarily described herein with respect to a dual ink system using a single precipitating agent for the sake of clarity, the concepts inherent in this invention are equally applicable to thermal inkjet printing systems/cartridges which involve more than two colored ink compositions. Regardless of the type and complexity of the thermal inkjet printing system being used, the present invention effectively prevents color bleed between adjacent multi-color ink regions in a highly efficient manner. As described in greater detail below, this enables the production of clear, high-definition printed color images.

These and other objects, features, and advantages of the invention shall be described below in the following Detailed Description of Preferred Embodiments and Brief Description of the Drawings.

DETAILED DESCRIPTION OF PREFERRED EMBODIMENTS

Figure 1:
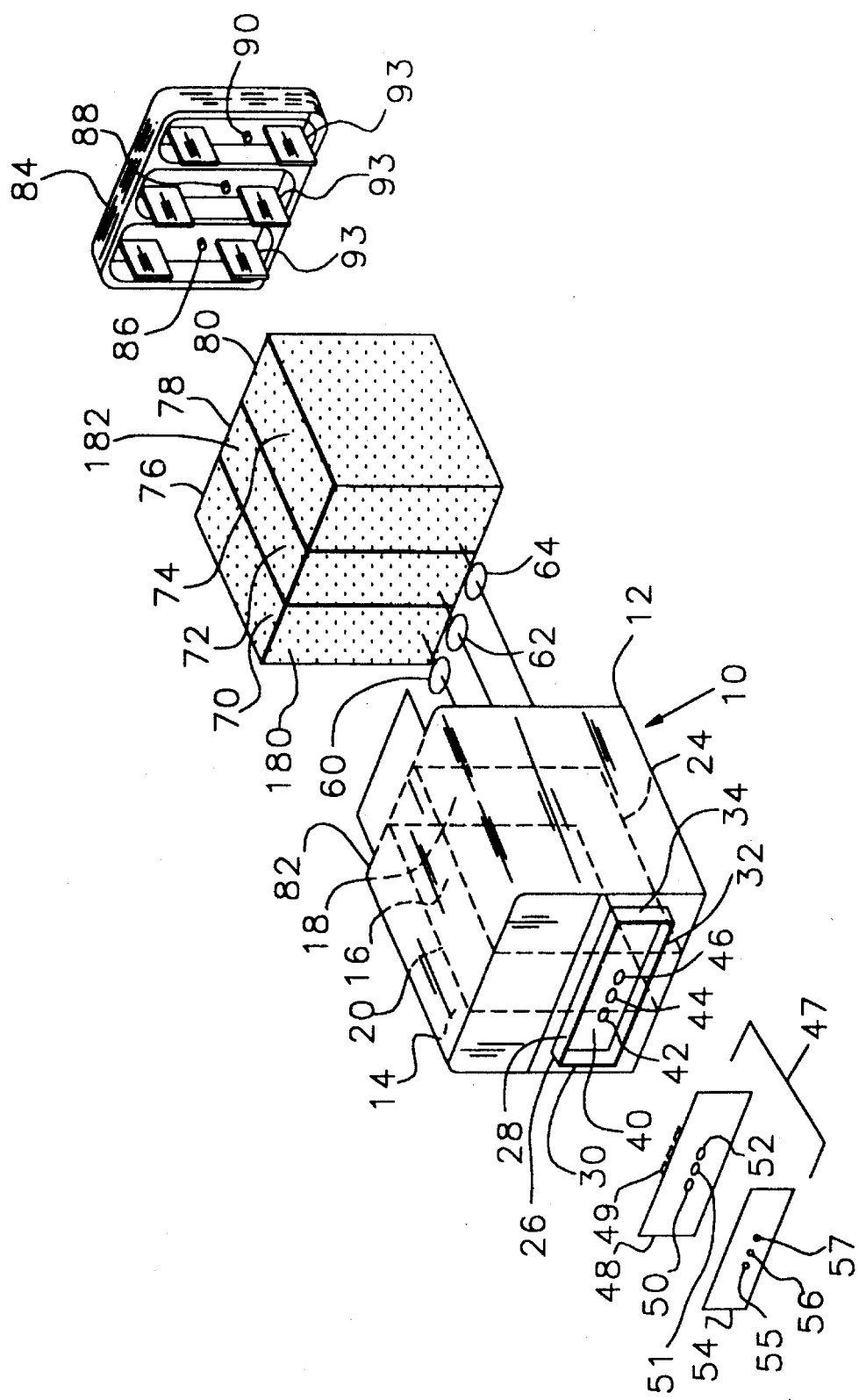
FIG. 1 is an exploded perspective view of an exemplary thermal inkjet cartridge having multiple ink compartments therein which may be used to produce multi-color images without color bleed therebetween in accordance with the present invention.

In accordance with the present invention, a unique and highly effective method for controlling color bleed between adjacent multi-color ink regions on a substrate is described herein. Conventional ink compositions used in thermal inkjet printing systems normally include a wide variety of chemical components. For example, typical ink compositions suitable for use in thermal inkjet printing systems are described in U.S. Pat. No. 4,963,189 to Hindagolla which is incorporated herein by reference. The primary components in such ink compositions include: (1) a coloring agent (e.g. a dye or pigment material) and (2) a solvent. Exemplary solvents, coloring agents, and other important ink components will be described in greater detail below.

However, when two different color ink compositions are applied to a substrate (e.g. paper) in regions which are adjacent to and in contact with each other (e.g. at their marginal edges), the coloring agents from each composition can bleed or migrate into each other. As a result, indistinct color images are produced which are characterized by non-linear and incomplete lines of demarcation between adjacent colored zones. When complex and intricate printed images are being applied to a substrate, the foregoing problems will result in a printed product having a low degree of print quality.

Color bleed (e.g. coloring agent migration) typically occurs between two ink compositions when the coloring agent from the first ink composition has properties which cause migration thereof into the second ink composition and vice versa. This phenomenon results in coloring agent movement between adjacent printed regions when both regions come in contact with each other.

Coloring agent migration is a particularly difficult problem when aqueous inks are used, since a significant amount of time is necessary for all of the volatile ink components therein to evaporate. During this delay, coloring agent migration can occur as described above. Likewise, the migration of coloring agents may be enhanced through capillary forces exerted on the ink compositions by fibers which are present in fibrous organic substrates (e.g. paper). Finally, it should be noted that the problem of color bleed is especially significant (from a visual/print quality perspective) when a region of black ink is applied adjacent to and in contact with a region of another ink color. In this situation, the black ink will typically migrate into the adjacent color region, thereby causing substantial image quality problems.

The present invention as described below involves a method in which at least two ink compositions which are especially prone to color bleed problems may be chemically formulated to prevent such problems from occurring. The method set forth herein effectively controls color bleed with respect to the ink compositions under consideration, and substantially eliminates print quality problems associated therewith.

In order to facilitate a full and complete understanding of the present invention, a discussion will first be provided involving exemplary thermal inkjet cartridges and printing systems which may be used to deliver the ink formulations of the present invention to a substrate.

FIG. 1 schematically illustrates an exemplary thermal inkjet cartridge which is suitable for use in accordance with the present invention. It should be noted and emphasized that the method of the present invention and the formulations described herein shall not be limited to use in the specific thermal inkjet cartridge of FIG. 1. Other thermal inkjet cartridges known in the art which are suitable for the purposes described herein may also be used as indicated below.

With reference to FIG. 1, an exemplary thermal inkjet cartridge 10 designed to produce multi-color printed images is schematically illustrated. Cartridge 10 is of the type illustrated and disclosed in U.S. Pat. Nos. 4,771,295 and 5,025,271 both to Baker et. al. which are incorporated herein by reference. As shown in FIG. 1, the cartridge 10 includes a housing 12 having first, second, and third chambers or compartments 14, 16, 18 therein. Compartments 14, 16 are separated by a solid, continuous wall 20 (shown in dashed lines in FIG. 1), while compartments 16, 18 are separated by a solid, continuous wall 24 (also shown in dashed lines in FIG. 1). The housing 12 further includes an externally-positioned support structure 26 which is constructed of a plurality of side walls 28, 30, 32, 34 with a substantially rectangular center zone 40 therebetween. Positioned within the center zone 40 and passing entirely through the housing 12 are a plurality of ink outlet ports 42, 44, 46 which respectively communicate with the compartments 14, 16, 18.

With continued reference to FIG. 1, the center zone 40 of the support structure 26 is sized to receive a thin-film resistor-type printhead unit 47 which is well known in the art. The printhead unit 47 includes a substrate 48 having a plurality of resistors 49 thereon which are schematically illustrated and enlarged for the sake of clarity in FIG. 1. Likewise, the substrate 48 further includes a plurality of orifices 50, 51, 52 which pass entirely through the substrate 48 and communicate respectively with the ink outlet ports 42, 44, 46 in the assembled cartridge 10. In addition, secured to the substrate 48 is an orifice plate 54. The orifice plate 54 is preferably made of an inert metal composition (e.g. gold-plated nickel), and further includes a plurality of ink ejection orifices 55, 56, 57 which pass entirely therethrough. The ink ejection orifices 55, 56, 57 are arranged on the orifice plate 54 so that they respectively register with the orifices 50, 51, 52 in the substrate 48. This configuration ultimately enables ink to be withdrawn from the compartments 14, 16, 18 and thereafter expelled from the ink ejection orifices 55, 56, 57.

As shown in FIG. 1, three ink filters 60, 62, 64 are provided which are each mounted respectively within the compartments 14, 16, 18 as illustrated. Specifically, the ink filter 60 is mounted within compartment 14 directly adjacent to and against the ink outlet port 42. Likewise, the ink filter 62 is mounted within compartment 16 directly adjacent to and against the ink outlet port 44, while the ink filter 64 is mounted within compartment 18 directly adjacent to and against the ink outlet port 46. The ink filters 60, 62, 64 are preferably manufactured from stainless steel wire mesh having a porosity sufficient to provide substantial filtration of air bubbles and solid particulates when ink passes from the compartments 14, 16, 18 into and through the ink outlet ports 42, 44, 46.

Also provided as illustrated in FIG. 1 are three foam portions 70, 72, 74. The foam portions 70, 72, 74 are each designed for placement within compartments 14, 16, 18, respectively. Likewise, the foam portions 70, 72, 74 are preferably sized to be slightly larger than the compartments designed to receive them so that when the foam portions 70, 72, 74 are placed therein, they will expand outwardly within the compartments. The foam material used to produce the foam portions 70, 72, 74 preferably consists of an ether-type foam well known in the art which is commercially available from the Scott Paper Company of Philadelphia, Pa.

Fitted onto the ends 76, 78, 80 of the foam portions 70, 72, 74 and secured to the rear 82 of the housing 12 is a cap member 84 which prevents back pressure build-up and facilitates the ultimate delivery of ink from the foam portions 70, 72, 74 to the printhead unit 47. Air vents 86, 88, 90 are provided which are each covered with porous plastic membranes (not shown). The membranes allow air to pass therethrough while preventing ink from leaking outwardly through the air vents 86, 88, 90. Finally, the cap member 84 further includes compression tabs 93 which are designed to facilitate proper placement/orientation of the foam portions 70, 72, 74 within their respective compartments. Further structural and operational information regarding cartridge 10 is provided in U.S. Pat. Nos. 4,771,295 and 5,025,271 both to Baker et. al., as well as in the *Hewlett-Packard Journal*, Vol. 39, No. 4 (August 1988).

Figure 2:
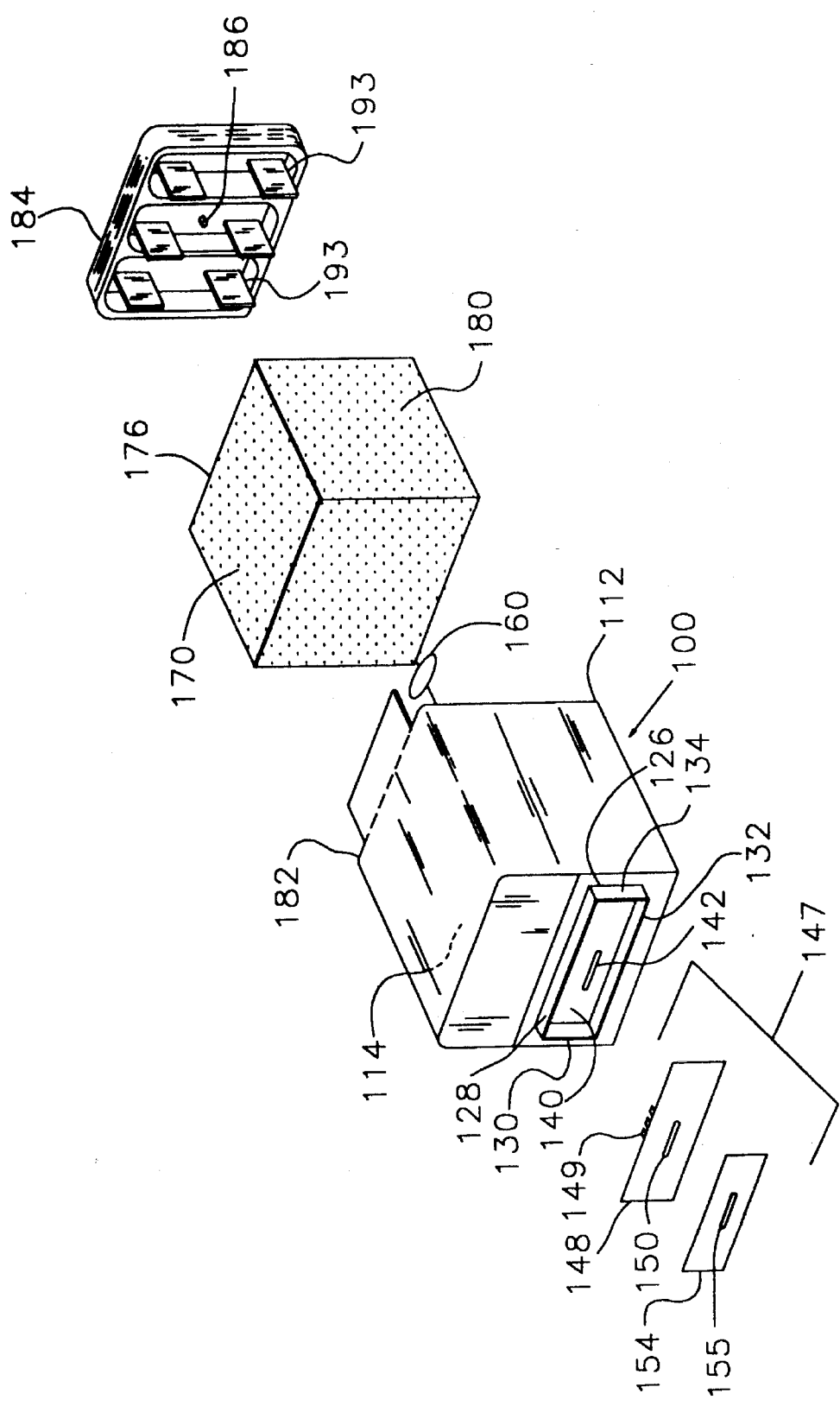
FIG. 2 is an exploded perspective view of an alternative thermal inkjet cartridge which may be used in accordance with the present invention.

FIG. 2 schematically illustrates a simplified version of cartridge 10 which is also suitable for use in accordance with the present invention. With reference to FIG. 2, a single-chamber cartridge 100 is illustrated which includes a housing 112 having a single chamber or compartment 114 therein. The housing 112 further includes an externally-positioned support structure 126 which is constructed of a plurality of side walls 128, 130, 132, 134 with a substantially rectangular center zone 140 therebetween. Positioned within the center zone 140 and passing entirely through the housing 112 is an elongate ink outlet port 142 which communicates with the compartment 114 as illustrated.

With continued reference to FIG. 2, the center zone 0 of the support structure 126 is sized to receive a thin-film resistor-type printhead unit 147 which is well known in the art. The printhead unit 147 includes a substrate 148 having a plurality of resistors 149 thereon which are schematically illustrated and enlarged for the sake of clarity in FIG. 2. Likewise, the substrate 148 further includes an elongate orifice 150 which passes entirely through the substrate 148 and communicates directly with the ink outlet port 142 in the assembled cartridge 100. In addition, secured to the substrate 148 is an orifice plate 154. The orifice plate 154 is preferably manufactured of an inert metal composition (e.g. gold-plated nickel), and further includes an ink ejection orifice 155. The ink ejection orifice 155 registers with the orifice 150 in the substrate 148. This configuration ultimately enables ink to be withdrawn from the compartment 114 and thereafter expelled from the ink ejection orifice 155.

As shown in FIG. 1, an ink filter 160 is provided which is mounted within the compartment 114 as illustrated. Specifically, the ink filter 160 is mounted within compartment 114 directly adjacent to and against the ink outlet port 142. The ink filter 160 is preferably manufactured from stainless steel wire mesh having a porosity sufficient to provide substantial filtration of air bubbles and solid particulates when ink passes from the compartment 114 into and through the ink outlet port 142.

Also provided as illustrated in FIG. 2 is a single foam portion 170. The foam portion 170 is preferably sized to be slightly larger than the compartment 114 designed to receive it so that when the foam portion 170 is placed therein, it will expand outwardly within the compartment 114. The foam material used to produce the foam portion 170 preferably consists of an ether-type foam well known in the art which is commercially available from the Scott Paper Company of Philadelphia, Pa.

Fitted onto the end 176 of the foam portion 170 and secured to the rear 182 of the housing 112 is a cap member 184 which prevents back pressure build-up and facilitates the ultimate delivery of ink from the foam portion 170 to the printhead unit 147. Air vent 186 is provided which is covered with a porous plastic membrane (not shown). The membrane allows air to pass therethrough while preventing ink from leaking outwardly through the air vent 186. Finally, cap member 184 may further include one or more compression tabs 193 which are designed to facilitate proper placement/orientation of the foam portion 170 within compartment 114. Further structural and operational information regarding cartridge 100 is generally provided in the *Hewlett-Packard Journal*, Vol. 39, No. 4 (August 1988) and in U.S. Pat. No. 4,794,409 to Cowger et al.

Basically, cartridge 10, cartridge 100, and other thermal inkjet cartridges known in the art which are suitable for the purposes set forth herein deliver ink through the selective activation (heating) of the thin film resistors associated with the printhead substrate. Selective heating of the resistors causes ink coming in contact therewith to be forcefully expelled from the orifice plate of the selected cartridge. Heating of the resistors is accomplished using pulse drive circuitry (not shown) which is either integrated onto the printhead or externally positioned within the main printer unit. By activating the cartridge in this manner, ink can be expelled therefrom to produce a finished printed image.

Multi-compartment ink cartridges of the type illustrated in FIG. 1 and described herein are designed to retain supplies of various colored ink compositions therein. For the purposes of this invention, the term "colored ink compositions" shall also encompass black ink. Specifically, the multi-compartment cartridge 10 of FIG. 1 may be configured to retain any number of colored ink compositions including but not limited to cyan, magenta, yellow, and/or black ink. The black ink may be contained within one of the foam portions 70, 72, 74 held within compartments 14, 16, 18. In the alternative, the black ink may be retained within a separate cartridge (e.g. within the foam portion 170 in the compartment 114 of cartridge 100 as shown in FIG. 2). The cartridge 100 would then operate in the same printer unit along with cartridge 10. Having a separate cartridge for black ink is often desirable since black ink is typically consumed at a greater rate compared with other color inks in a multi-ink system. As a result, once the black ink is consumed, the black ink cartridge may be discarded without disposal of the other ink cartridge and any ink left therein.

As previously indicated, color bleed problems may occur when at least one of the foregoing ink compositions is printed in a region directly adjacent to and in contact with (e.g. at the marginal edges of) a region consisting of another colored ink composition. This problem is especially acute when a region of black ink is printed adjacent to and in contact with a region of a different colored ink (e.g. cyan, magenta, and/or yellow). The present invention involves a method for formulating the foregoing ink compositions so that color bleed therebetween is minimized and/or eliminated. Since color bleed normally occurs between two different ink compositions printed adjacent to and in contact with each other, the present invention will be described herein for the sake of clarity with respect to a dual ink system wherein both ink compositions are specially formulated to avoid color bleed therebetween. However, it should be noted that the basic conceptual methods described below with respect to a dual ink system are also applicable to a system involving more than two colored ink compositions. An individual skilled in the art may readily accomplish this by merely applying the broad concepts set forth herein to other ink compositions which may be prone to color bleed problems. Accordingly, the present invention shall not be limited to use exclusively in dual ink systems, and shall also not be limited to the specific ink compositions set forth herein.

In order to prevent color bleed between any two ink compositions in accordance with the present invention, both of the ink compositions must be specially formulated. In an exemplary situation involving the control of color bleed between two ink compositions (hereinafter "Ink Composition 1" and "Ink Composition 2"), the preferred formulations thereof are as follows:

Ink composition 1

The first component of ink composition 1 consists of a first coloring agent preferably in the form of an organic dye having at least one and preferably two or more carboxyl and/or carboxylate groups. Exemplary carboxylated dye materials suitable for use in the present invention are listed in U.S. Pat. No. 4,963,189 to Hindagolla which is incorporated herein by reference. Such materials are black and involve the following basic structure:

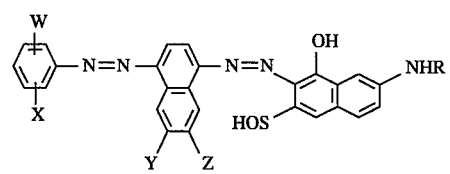

[W=—COOH

X=—H, or —COOH

Y=—H, —COOH, or —SO$_3$H
Z=—H, —COOH, or —SO$_3$H
R=—H, —CH$_2$COOH, or —CH$_2$CH$_2$COOH]

In this structure, it is preferred that there be at least two —COOH groups as indicated above, and that the number of —COOH groups be equal to or greater than the number of —SO$_3$H groups. Specific and exemplary dye structures are provided in Table I below:

TABLE I

| Dye # | X | W | Y | Z | R |
|---|---|---|---|---|---|
| 1 | 3-COOH | 5-COOH | H | H | H |
| 2 | 3-COOH | 5-COOH | COOH | H | H |
| 3 | 3-COOH | 5-COOH | H | COOH | H |
| 4 | 3-COOH | 5-COOH | H | SO$_3$H | H |
| 5 | 3-COOH | 5-COOH | SO$_3$H | H | H |
| 6 | H | 4-COOH | H | COOH | H |
| 7 | 3-COOH | 4-COOH | H | H | CH$_2$COOH |
| 8 | 2-COOH | 5-COOH | H | SO$_3$H | CH$_2$COOH |
| 9 | 3-COOH | 5-COOH | SO$_3$H | H | CH$_2$COOH |
| 10 | 3-COOH | 5-COOH | H | H | CH$_2$CH$_2$COOH |
| 11 | 3-COOH | 5-COOH | H | COOH | CH$_2$COOH |

Additional carboxylated dye materials suitable for use in the present invention are described in the *Color Index*, vol. 4, 3rd ed., published by The Society of Dyers and colourists, Yorkshire, England (1971), which is incorporated herein by reference and is a standard reference that is well known in the art. Exemplary carboxylated dye materials listed in the *Color Index* which are suitable for use herein are listed below in Table II:

TABLE II

| Color Index Number | Name |
|---|---|
| 14045 | Mordant Yellow 12 |
| 14055 | Mordant Yellow 14 |
| 23640 | Direct Yellow 2 |
| 23645 | Triazol Red 10B (By) |
| 23660 | Direct Yellow 48 |
| 36040 | Dianil Fast Brown B (MLB) |
| 36210 | Oxydiamine Brown RN (C) |
| 36220 | Columbia Catechine O (A) |
| 43550 | Mordant Violet 11 |
| 43555 | Mordant Violet 10 |
| 43560 | Mordant Violet 15 |
| 43565 | Mordant Violet 1 |
| 43570 | Mordant Violet 28 |
| 43810 | Mordant Violet 39 |
| 43820 | Mordant Blue 3 |
| 43825 | Mordant Blue 29 |
| 43830 | Mordant Blue 1 |
| 43835 | Mordant Blue 55 |
| 43840 | Chromoxane Green GG (By) |
| 43845 | Mordant Green 21 |
| 43850 | Chromoxane Brl't Blue GM |
| 43855 | Mordant Blue 47 |
| 43860 | Mordant Violet 27 |
| 43865 | Mordant Violet 16 |
| 43866 | Mordant Violet 17 |
| 43870 | Mordant Violet 33 |

Further information regarding the foregoing compositions is provided on pages 4059, 4193, 4194, 4340, and 4406–4410 of the Color Index, supra, with such pages being incorporated herein by reference.

In a preferred embodiment, ink composition 1 will have a coloring agent concentration level broadly ranging from about 0.5% by weight up to the solubility limit of the coloring agent in the ink composition. The solubility level of the coloring agent will necessarily vary, depending on the specific coloring agent being used. However, in a preferred embodiment, ink composition 1 will contain about 2–7% by weight coloring agent.

It should also be noted that the coloring agent used in ink composition 1 in the embodiment described herein is preferably darker (e.g. black) than the coloring agent used in ink composition 2 for the reasons described below. In addition, it is also contemplated that the term "coloring agent" as used herein shall further include the use of carboxylated pigment dispersion materials known in the art (hereinafter "pigment dispersion materials"). Carboxylated pigment dispersion materials basically involve a water insoluble colorant (e.g. a pigment) which is rendered soluble through association with a dispersant which preferably contains carboxylate solubilizing groups (e.g. an acrylic dispersant). Colorant materials in combination with the dispersants which are used to produce the foregoing pigment dispersion materials normally consist of inorganic and organic dye compositions (e.g. pigments) known in the art. Examples of such pigments include but are not limited to the following compositions which are listed in the *Color Index*, supra: Pigment Black 7 (C.I. # 77266), Pigment Blue 15 (C.I. # 74160), Pigment Red 2 (C.I. # 12310), and Disperse Red 17 (C.I. # 11210). All of these materials are listed on pages 4018, 4035, 4618, and 4661 of the *Color Index*, supra, which are again incorporated herein by reference. As noted above, the foregoing pigments are combined with dispersants having at least one and preferably multiple carboxyl groups which basically consist of acrylic monomers and polymers known in the art. An exemplary dispersant includes a product sold by W. R. Grace and Co. of Lexington Mass., USA under the trademark DAXAD 30-30. However, as indicated above, the present invention shall not be limited exclusively to use of the dyes and/or pigment dispersion materials listed above. Other chemically comparable materials may be used which are determined by reasonable investigation to be suitable for the purposes set forth herein.

Next, ink composition 1 contains one or more solvents. A wide variety of solvents may be used as described in U.S. Pat. No. 4,963,189. For example, exemplary solvents would include but are not limited to ethylene glycol, diethylene glycol, triethylene glycol, 1,5-pentanediol, 2-pyrrolidone, 2-(2-butoxyethoxy) ethanol and/or combinations thereof. In a preferred embodiment, ink composition 1 will contain up to about 1–70% by weight solvent (about 15–20% by weight=optimum).

An optional biocide known in the art may also be added to the coloring agent and solvent in order to prevent any microbial growth in the final ink composition. Exemplary biocides suitable for this purpose would include proprietary products sold under the trademarks PROXEL GXL by Imperial Chemical Industries of Manchester, England; UCARCIDE 250 by Union Carbide of Danbury Conn., USA; and NUOSEPT 95 by Huls America, Inc. of Piscataway N.J., USA. In a preferred embodiment, if a biocide is used, the final ink composition will include about 0.05–0.5% by weight biocide, with about 0.30% by weight being preferred.

Finally, in order to produce a given volume of ink composition 1 having the foregoing component quantities therein, the remainder of ink composition 1 will preferably consist of water.

In summary, an exemplary ink composition 1 is described below in Table III as follows:

TABLE III

| Component | Wt. % |
| --- | --- |
| Solvent (2-pyrrolidone) | 15.0 |
| Coloring Agent (dye #4 from Table I above, $NH_4^+$ form) | 2.0 |
| Biocide (PROXEL GXL) | 0.3 |
| Water | 82.7 |
| | 100.0 |

It should also be noted that the composition listed above is preferably adjusted to a pH of about 8.5 through the addition of $NH_4OH$. Under certain limited circumstances, it may be desirable and necessary to increase the pH of ink composition 1 in order to ensure that the coloring agent remains in solution. This is typically accomplished through pilot tests with ink composition 1 wherein a direct observation of the completed ink composition will indicate whether precipitation of the coloring agent has occurred. To control/prevent this situation from taking place, a base (e.g. $NH_4OH$) is preferably added to the ink composition in order to place the coloring agent back into solution. The amount of base suitable for this purpose and the resulting pH of the composition is then noted and used in subsequent formulations. In general, the use of a pH adjusting agent (if necessary) will depend on the type of coloring agent being used. Also, the amount of pH adjusting agent and the type thereof is readily determinable using pilot tests in conjunction with the exercise of routine chemical procedures which are well known in the art.

With respect to the specific information presented herein regarding ink composition 1, such information is for example purposes only, and the present invention shall not be limited exclusively to the above-listed materials and proportions.

Ink Composition 2

Regarding ink composition 2, such composition first includes a precipitating agent therein. The precipitating agent is of a type which reacts with the carboxyl and/or carboxylate groups of the coloring agent of ink composition 1 to form a solid precipitate therefrom. In a preferred embodiment, the precipitating agent will consist of a multi-valent metal salt. Exemplary multi-valent metal cations suitable for use in the multi-valent metal salt include the following cations listed below in Table IV:

TABLE IV

| | |
| --- | --- |
| Transition metals: | $Cr^{+3}$, $Mn^{+2}$, $Fe^{+2}$, $Fe^{+3}$, $Co^{+2}$, $Ni^{+2}$, $Cu^{+2}$, $Zn^{+2}$, $Y^{+3}$, $Cd^{+2}$ |
| Group IIA metals: | $Mg^{+2}$, $Ca^{+2}$, $Sr^{+2}$, $Ba^{+2}$ |
| Group IIIA metals: | $Al^{+3}$, $Ga^{+3}$, $In^{+3}$ |
| Lanthanoid metals: | $Ce^{+3}$, $Pr^{+3}$, $Nd^{+3}$, $Sm^{+3}$, $Eu^{+3}$, $Gd^{+3}$, $Tb^{+3}$, $Dy^{+3}$, $Ho^{+3}$, $Er^{+3}$, $Tm^{+3}$, $Yb^{+3}$, $Lu^{+3}$ |

However, the following multi-valent metal cations are preferred in the present invention: $Ca^{+2}$, $Cu^{+2}$, $Co^{+2}$, $Ni^{+2}$, $Fe^{+2}$, $La^{+3}$, $Nd^{+3}$, $Y^{+3}$, and $Al^{+3}$. Suitable and exemplary anions which may be coupled with the foregoing cations include but are not limited to: $NO_3^-$, $F^-$, $Cl^-$, $Br^-$, $I^-$, $CH_3COO^-$, and $SO_4^{-2}$. Accordingly, preferred multi-valent metal salts derived from the above-described cations and anions include but are not limited to: $Ca(NO_3)_2$, $CaCl_2$, $Ca(CH_3COO)_2$, $Al(NO_3)_3$, $Nd(NO_3)_3$, $Y(NO_3)_3$, $Cu(NO_3)_2$, $CuCl_2$, $CoCl_2$, $Co(NO_3)_2$, $NiCl_2$, and $Ni(NO_3)_2$. It should be noted that other multi-valent metal salts derived from the above-listed cations and anions may also be prepared and used in the manner described herein. However, when selecting the appropriate multi-valent metal salt, the exercise of basic chemical techniques will dictate which compounds are most appropriate and which are not. For example, it is well known in the art that $AlCl_3$ produces a violent reaction when combined with water (e.g. the production of HCl gas). Thus, a reasonable and skilled chemist would conclude that this material would not be especially desirable for use in the present invention. Likewise, the desirability of other multi-valent metal salts may also be determined in this manner. Also, it should be noted that, in certain isolated instances, the pH of ink composition 2 may need to be slightly adjusted, depending on the specific metal salt being used in ink composition 2. Specifically, a side reaction may occur in which the metal cations in ink composition 2 form insoluble metal hydroxides if the pH of composition 2 is too high. Preliminary pilot tests with the selected ink compositions will provide an indication as to whether this situation will occur. If it does, it may be controlled by adjusting the pH of ink composition 2 downward using a selected acid (e.g. $HNO_3$). The amount and type of pH adjusting agent, as well as the general need for pH adjustments with respect to ink composition 2 are all determined using pilot tests as noted above, in conjunction with the exercise of routine chemical procedures which are well known in the art.

In a preferred embodiment, ink composition 2 will include about 0.3–40% by weight multi-valent metal salt (about 1–15% by weight=optimum). Further information regarding the precipitation reaction between the multi-valent metal salt of ink composition 2 and the coloring agent of ink composition 1, as well as other operational characteristics of the present ink materials shall be described in greater detail below.

Next, ink composition 2 contains a second coloring agent which is different from the first coloring agent in ink composition 1. The coloring agent of ink composition 2 must be carefully selected for a variety of reasons. First, the coloring agent should be of a type which is preferably lighter than the coloring agent used in ink composition 1. If a black coloring agent is used in ink composition 1, then almost any other color may be appropriately selected for the coloring agent in ink composition 2. Next, the coloring agent in ink composition 2 must be of a type which will not react with the precipitating agent when these two materials are combined. More specifically, the coloring agent in ink composition 2 must be of a type which remains soluble when combined with the precipitating agent. This normally results when a coloring agent is used which does not gain its solubility mainly from carboxyl and/or carboxylate groups, and remains soluble in solutions of moderate to high ionic strength. In this regard, exemplary and preferred dyes suitable for use in ink composition 2 shall include but are not limited to the following materials presented below in Table V:

TABLE V

| Color Index Number | Name |
| --- | --- |
| 42090 | Acid Blue 9 |
| 45100 | Acid Red 52 |
| 19140 | Acid Yellow 23 |
| 45110 | Acid Red 289 |
| Not avail. | Direct Blue 199 |
| Not avail. | Direct Blue 189 |

Many of these materials are listed in the *Color Index*, supra, on pages 4132, 4385, and 4419 which are incorporated herein by reference. Furthermore, in accordance with the definition of "coloring agent" set forth herein, various pigment dispersion materials may also be used in ink composition 2. Such pigment dispersion materials shall be of a type which will not react with the foregoing precipitating agents. For example, suitable compositions for this purpose would include nonionic pigment dispersions, lignosulfonate dispersions, and/or amine dispersions known in the art which, as determined by preliminary pilot studies, would not react with the precipitating agents described herein.

In a preferred embodiment, the amount of coloring agent used in ink composition 2 will be about the same as the amount of coloring agent used in ink composition 1 (e.g. from about 0.5% by weight up to the solubility limit of the coloring agent, with an optimum range of about 2–7% by weight).

The remaining components of ink composition 2 are preferably the same as those in ink composition 1. For example, the same solvents and other ingredients (e.g. biocides, water, etc.) may be used in approximately the same quantity ranges. Accordingly, the only true and significant differences between ink composition 1 and ink composition 2 are: (1) the use of different coloring agents having different reactivities/solubility characteristics; and (2) the inclusion of a precipitating agent in ink composition 2. Finally, it should be noted that any other chemical composition which may be optionally added to ink composition 2 (e.g. preservatives, anti-clogging agents, etc.) should be preliminarily tested in initial, pilot studies of ink composition 2. Preliminary testing in this manner will indicate whether the added materials cause an undesired, premature precipitation reaction with the precipitating agent.

In summary, an exemplary ink composition 2 is presented below in Table VI as follows:

TABLE VI

| Component | Wt. % |
| --- | --- |
| Solvent (2-(2-butoxyethoxy) ethanol) | 15.0 |
| Coloring Agent (Acid Yellow 23 - trimethylammonium form) | 2.0 |
| Precip. Agt. ($Ca(NO_3)_2$) | 10.0 |
| Biocide (PROXEL GXL) | 0.3 |
| Water | 72.7 |
| | 100.0% |

Operation of the Invention

In order to implement the present invention using the foregoing ink compositions, a printing cartridge system is first selected. For example, a multi-compartment thermal inkjet cartridge of the type illustrated in FIG. 1 and described in U.S. Pat. Nos. 4,771,295 and 5,025,271 both to Baker et al. may be used to dispense the ink compositions of the present invention. In the alternative, each ink composition may be applied from a separate ink cartridge as previously noted. Accordingly, the present invention shall not be limited to any specific thermal inkjet hardware. However, for the sake of clarity, operation of the ink system of the present invention shall first be described with reference to the multi-compartment thermal inkjet cartridge of U.S. Pat. Nos. 4,771,295 and 5,025,271 as shown in FIG. 1.

Basically, the ink cartridge 10 of FIG. 1 has first, second, and third compartments 14, 16, 18 as indicated above. With respect to the above-described ink compositions, ink composition 1 and ink composition 2 are each loaded into one of the compartments 14, 16, 18. For example, ink composition 1 (indicated at reference number 180 in FIGS. 1 and 3) may be retained within the foam portion 70 of the first compartment 14, while ink composition 2 (reference number 182 in FIGS. 1 and 3) may be retained within the foam portion 72 of the second compartment 16. However, it is to be understood that the present invention shall not be limited to any specific loading method with respect to the ink compositions described herein.

Figure 3:
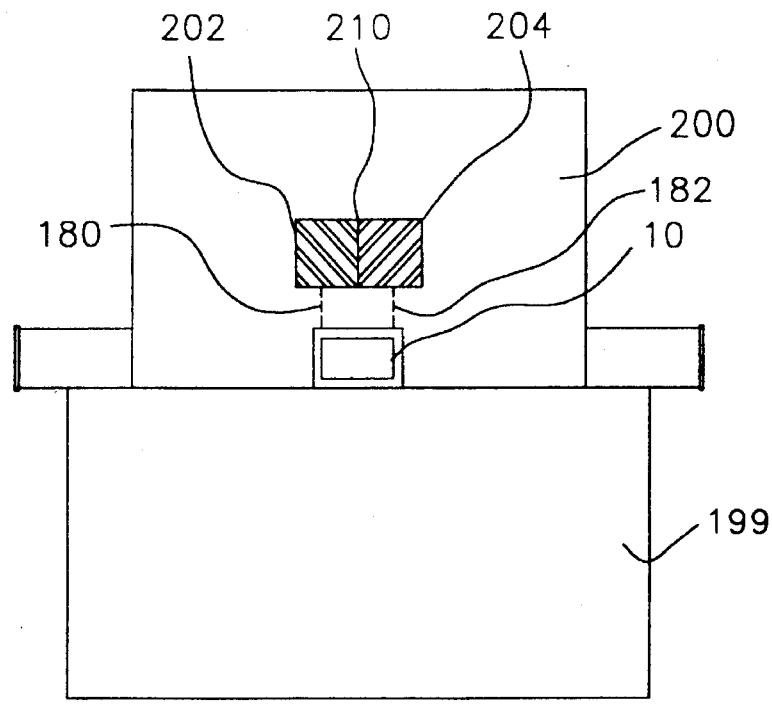
FIG. 3 is a schematic illustration of the thermal inkjet cartridge of FIG. 1 wherein such cartridge is dispensing the ink compositions of the present invention in separate regions on a substrate.

Thereafter, as schematically illustrated in FIG. 3, the cartridge 10 is positioned within a printer unit 199 known in the art. An exemplary printer unit 199 suitable for this purpose would include a product sold under the trademark DESKWRITER C by the Hewlett-Packard Company of Palo Alto Calif., USA. The cartridge 10 is thereafter activated in order to deliver ink composition 1 (reference number 180) and ink composition 2 (reference number 182) to a substrate 200 (e.g. paper) using conventional thermal inkjet techniques. Such techniques basically involve selective activation of heating resistors within the printhead unit 47 which causes thermal excitation and expulsion of ink from the cartridge 10 in accordance with the principles set forth in the *Hewlett-Packard Journal*, Vol. 39, No. 4 (August 1988).

Interaction between the ink compositions of the present invention occurs when such compositions are printed in regions on the substrate 200 which are adjacent to and in contact with each other (e.g. at the marginal edges thereof). Normally, color bleed would be expected to occur in this situation, especially when one of the ink compositions involves black ink. Bleed problems involving black ink are especially acute because the migration of black ink into other colors is more visually apparent compared with situations involving other, lighter colors. In the present invention using the ink formulations described herein, ink bleed and the print quality problems associated therewith (especially with respect to black ink) are effectively controlled.

With continued reference to FIG. 3, the cartridge 10 is used to apply ink composition 1 to a first region 202 on the substrate 200, while ink composition 2 is applied to a second region 204 on the substrate. First region 202 and second region 204 are directly adjacent to and in direct contact with each other at position (e.g. common marginal edge) 210 on the substrate 200 as illustrated. Normally, this printing pattern would be expected to cause color bleed problems. However, in accordance with the present invention, the precipitating agent in ink composition 2 is allowed to react with one or more of the reactive groups of the carboxylated coloring agent in ink composition 1. As a result, the coloring agent is converted into a solid precipitate. Because it is insoluble, the precipitate does not migrate from the first region 202 into the second region 204, and is also not as subject to capillary forces which exist when fibrous substrates (e.g. paper) are used. Accordingly, precipitate formation in this manner effectively prevents print quality reduction, and ensures that clear lines of demarcation exist between adjacent regions of different ink compositions.

Figure 4:
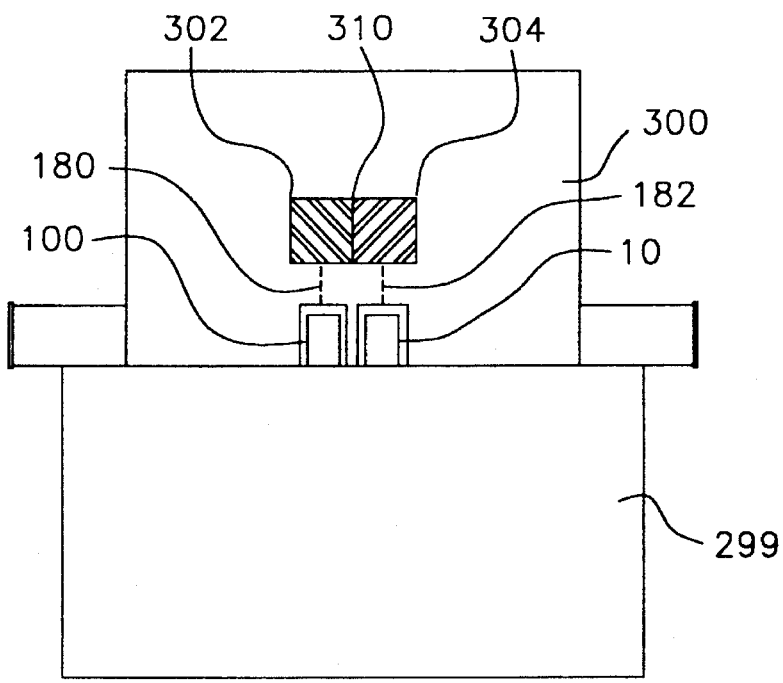
FIG. 4 is a schematic illustration of a printing system using multiple thermal inkjet cartridges of the types shown in FIGS. 1 and FIG. 2 in order to dispense the ink compositions of the present invention in separate regions on a substrate.

An alternative method of operation is schematically illustrated in FIG. 4. FIG. 4 involves the use of a printing system having two ink cartridges therein which operate together. Specifically, in this embodiment, the first cartridge consists of a single-compartment cartridge 100 as shown in FIG. 2, and the second cartridge consists of a multi-compartment cartridge 10 illustrated in FIG. 1. Cartridges 10, 100 are both removably secured to and within a printer unit 299 known in the art. An exemplary printer unit 299 suitable for this purpose would include a unit manufactured and sold by the Hewlett-Packard Company of Palo Alto, Calif., USA under the trademark "PaintJet".

As stated above, cartridge 10 has first, second, and third compartments 14, 16, 18. With respect to the above-described ink compositions, ink composition 2 is loaded into one of the compartments 14, 16, 18. For example, ink composition 2 (indicated at reference number 182 in FIGS. 1 and 4) may be retained within the foam portion 72 of the second compartment 16. Other color ink compositions may then be retained within compartments 14, 18 as desired. However, it shall be understood that the first cartridge set forth herein does not necessarily have to be of the multi-compartment variety.

Ink cartridge 100 (e.g. the second cartridge) is then supplied with ink composition 1. Specifically, ink composition 1 (indicated at reference number 180 in FIGS. 2 and 4) is retained within the foam portion 170 of single compartment 114 in housing 112. In this embodiment wherein a single compartment cartridge is used as the second cartridge, it is preferred that ink composition 1 involve a black coloring agent. When black ink is being used, it is often desirable to retain the black ink in a separate cartridge since black ink is normally consumed at a higher rate compared with other ink materials. Thus, when the black ink is depleted, the cartridge containing the same can be discarded separately from the cartridge containing other color inks, which may still be present in abundant supply.

Thereafter, as schematically illustrated in FIG. 4, the cartridge 10 is activated in order to deliver ink composition 2 (reference number 182) to a substrate 300 (e.g. paper) using conventional thermal inkjet techniques. Such techniques basically involve selective activation of heating resistors on the printhead unit 47 which causes thermal excitation and expulsion of ink from the cartridge 10 in accordance with the principles set forth in the *Hewlett-Packard Journal,* Vol. 39, No. 4 (August 1988) as noted above. Likewise, and substantially simultaneously therewith, cartridge 100 is activated in order to deliver ink composition 1 (reference number 180) to substrate 300 using the same methods and techniques.

Interaction between the ink compositions of the present invention in this embodiment occurs when such compositions are printed in regions on the substrate 300 which are adjacent to and in contact with each other (e.g. at the marginal edges thereof). With continued reference to FIG. 4, the cartridge 100 is used to apply ink composition 1 to a first region 302 of the substrate 300, while ink composition 2 is applied to a second region 304 on the substrate 300 by ink cartridge 10. First region 302 and second region 304 are directly adjacent to and in direct contact with each other at position (e.g. common marginal edge) 310 on the substrate 300 as illustrated. Normally, this printing pattern would be expected to cause color bleed problems. However, in accordance with the present invention, the precipitating agent in ink composition 2 is allowed to react with one or more of the reactive groups of the carboxylated coloring agent in ink composition 1 at position 310 to form a solid precipitate. Because it is insoluble, the precipitate does not migrate.

As indicated in the foregoing examples, precipitate formation using the methods and materials of the present invention effectively prevents print quality reduction, and ensures that clear lines of demarcation exist between adjacent printed regions. This is especially true with respect to the migration of black ink which causes substantial print quality problems in thermal inkjet printing systems. It should be noted that, in the examples provided herein involving ink compositions 1 and 2, only ink composition 2 has a precipitating agent therein. This is because the coloring agent in ink composition 1 was indicated to be black or otherwise darker than the coloring agent in ink composition 2. Thus, any bleed of the coloring agent of ink composition 2 into ink composition 1 would not cause significant print quality problems because such bleed would be substantially unobservable. If, in fact, the coloring agents in both ink compositions were light in color (e.g. of approximately equal color density), then a dual precipitation system could be readily formulated in accordance with the principles of the present invention. In this type of system, ink composition 1 would have a precipitating agent therein designed to react with the coloring agent of ink composition 2, and ink composition 2 would have a precipitating agent therein designed to react with the coloring agent of ink composition 1. Likewise, the same principles are readily applicable to ink systems in which more than two inks would be used, and the invention shall not be limited to systems involving only one precipitating agent and/or only two ink compositions.

The present invention represents an advance in the art of thermal inkjet printing technology. Use of the invention as described herein avoids color bleed problems in multi-color ink systems, thereby allowing the production of clear and distinct printed images. Having herein described preferred embodiments of the present invention, it is anticipated that suitable modifications may be made to the invention by individuals skilled in the art which nonetheless remain within the scope of the invention. For example, the present invention shall not be limited to the exact ink systems described herein, as well as the specific thermal inkjet cartridges set forth above. Thus, the present invention shall only be construed in accordance with the following claims:

We claim:

1. An inkjet ink set for use in printing multi-colored images while controlling color bleed between adjacent printed regions comprising:

a first ink composition, said first ink composition comprising a first coloring agent; and a second ink composition, said second ink composition comprising a second coloring agent and a precipitating agent which will react with said first coloring agent in said first ink composition in order to form a precipitate therefrom.

2. The inkjet ink set of claim 1 wherein said precipitating agent comprises a multi-valent metal salt.

3. The inkjet ink set of claim 2 wherein said multi-valent metal salt comprises a multi-valent metal cation selected from the group consisting of $Ca^{+2}$, $Cu^{+2}$, $Co^{+2}$, $Ni^{+2}$, $Fe^{+2}$, $La^{+3}$, $Nd^{+3}$, $Y^{+3}$, and $Al^{+3}$.

4. The inkier ink set of claim 2 wherein said multi-valent metal salt is selected from the group consisting of $Ca(NO_3)_2$, $CaCl_2$, $Ca(CH_3COO)_2$, $Al(NO_3)_3$, $Nd(NO_3)_3$, $Y(NO_3)_3$, $Cu(NO_3)_2$, $CuCl_2$, $CoCl_2$, $Co(NO_3)_2$, $NiCl_2$, and $Ni(NO_3)_2$.

5. The inkjet ink set of claim 2 wherein said first ink composition comprises about 2–7% by weight said first coloring agent, and said second ink composition comprises about 2–7% by weight said second coloring agent and about 1–15% by weight said multi-valent metal salt.

6. The inkier ink set of claim 1 wherein said first coloring agent is darker than said second coloring agent.

7. The inkier ink set of claim 1 wherein said first coloring agent is black.

8. An inkjet ink set for use in printing multi-colored images while controlling color bleed between adjacent printed regions comprising:

a first ink composition, said first ink composition comprising about 2–7% by weight of a first coloring agent; and a second ink composition, said second ink composition comprising about 2–7% by weight of a second coloring agent and about 1–15% by weight of a precipitating agent, said precipitating agent comprising at least one multi-valent metal salt which will react with said first coloring agent in said first ink composition in order to form a precipitate therefrom, said multi-valent metal salt comprising a multi-valent metal cation selected from the group consisting of $Ca^2$, $Cu^{+2}$, $Co^{+2}$, $Ni^{+2}$, $Fe^{+2}$, $La^{+3}$, $Nd^{+3}$, $Y^{+3}$, and $Al^{+3}$.

* * * * *